(12) United States Patent
Stanley

(10) Patent No.: US 10,712,223 B2
(45) Date of Patent: Jul. 14, 2020

(54) MASS PROPORTIONS SCALING APPARATUSES

(71) Applicant: Ronald F. Stanley, Silver Lake, WI (US)

(72) Inventor: Ronald F. Stanley, Silver Lake, WI (US)

( * ) Notice: Subject to any disclaimer, the term of this patent is extended or adjusted under 35 U.S.C. 154(b) by 0 days.

(21) Appl. No.: 16/438,182

(22) Filed: Jun. 11, 2019

(65) Prior Publication Data

US 2019/0376867 A1     Dec. 12, 2019

Related U.S. Application Data

(60) Provisional application No. 62/763,412, filed on Jun. 15, 2018, provisional application No. 62/763,255, filed on Jun. 11, 2018.

(51) Int. Cl.
| | |
|---|---|
| *G01M 1/14* | (2006.01) |
| *G01M 1/12* | (2006.01) |
| *G01P 3/18* | (2006.01) |
| *G01P 15/04* | (2006.01) |

(52) U.S. Cl.
CPC ............. *G01M 1/122* (2013.01); *G01M 1/14* (2013.01); *G01P 3/18* (2013.01); *G01P 15/04* (2013.01)

(58) Field of Classification Search
None
See application file for complete search history.

(56) References Cited

U.S. PATENT DOCUMENTS

| | | |
|---|---|---|
| 1,897,027 A | 2/1933 | Gumprich |
| 2,108,877 A | 2/1938 | Wettlaufer |
| 2,383,408 A | 8/1945 | Morgan |
| 2,595,717 A | 5/1952 | Smith |
| 3,371,523 A | 3/1968 | Crouch et al. |
| 3,577,771 A | 5/1971 | Solheim |
| 3,677,356 A | 7/1972 | Goodwin |
| 4,043,184 A * | 8/1977 | Sayers .................. G01M 1/10 73/65.03 |
| 4,212,193 A | 7/1980 | Turley |
| | (Continued) | |

OTHER PUBLICATIONS

"Alpha Accuswing 2 Swing Weight Machine," accessed at https://alltennissupplies.com/shop/alpha-accuswing-2-swing-weight-machine/.

*Primary Examiner* — Natalie Huls
*Assistant Examiner* — Jermaine L Jenkins
(74) *Attorney, Agent, or Firm* — Dale J. Ream

(57) ABSTRACT

The present disclosure provides an apparatus to measure swing mass moments of sports implements. The present disclosure further provides an apparatus to measure a center of mass point of sports implements. Some embodiments of the present disclosure further provide a single, compact apparatus configured to measure both a swing mass moment and a center of mass point of a sports implement. The disclosed swing mass measurement apparatus provides a compact mechanical device configured to quickly, accurately measure even small differences of implement swing mass. The disclosed center of mass point measurement apparatus provides a large roller rod adjuster, allowing easy adjustment of tested implements into balance of center mass over rod, then a touch stylus is moved into contact with the tested implements handle, for an accurate location measurement, that is projected onto a double size scale readout for enhanced comprehension.

12 Claims, 7 Drawing Sheets

(56) References Cited

U.S. PATENT DOCUMENTS

| | | | |
|---|---|---|---|
| 4,246,756 A | | 1/1981 | West |
| 4,389,049 A | | 6/1983 | Wiley |
| 4,747,314 A | * | 5/1988 | Huang ................ A63B 51/005 73/862.452 |
| 5,222,398 A | | 6/1993 | O'Brien |
| 5,277,059 A | | 1/1994 | Chastonay |
| 5,685,192 A | | 11/1997 | Shriner et al. |
| 5,814,773 A | * | 9/1998 | Latiri ..................... G01G 1/08 177/171 |
| 5,927,989 A | | 7/1999 | Kung et al. |
| 6,132,326 A | * | 10/2000 | Schweid ................ G01M 1/10 473/553 |
| 6,521,847 B1 | | 2/2003 | Ostermann |
| 6,637,265 B1 | | 10/2003 | Hay, Jr. et al. |
| 6,718,832 B1 | | 4/2004 | Hay, Jr. et al. |
| 6,765,153 B2 | | 7/2004 | Latiri |
| 7,415,866 B2 | * | 8/2008 | Latiri ..................... A63B 60/42 73/65.03 |
| 8,435,162 B1 | | 5/2013 | Al-Oboudi |
| 10,151,660 B2 | | 12/2018 | Stanley |
| 2004/0048696 A1 | | 3/2004 | Ciesar et al. |
| 2006/0215813 A1 | | 9/2006 | Scherch et al. |

\* cited by examiner

MASS PROPORTIONS SCALING APPARATUSES

CROSS REFERENCE TO RELATED APPLICATIONS

This application claims priority to and the benefit of U.S. Provisional Patent Application No. 62/763,255, filed Jun. 11, 2018, entitled, "Swing Mass Scale (SMS)", and of U.S. Provisional Patent Application No. 62/763,412, filed Jun. 15, 2018, entitled, "Balance Measurement Scale BMS", the contents of both of which are herein incorporated by reference in their entireties.

FIELD

The present disclosure relates to apparatuses configured to measure mass proportion characteristics of sports implements.

BACKGROUND

Tennis players frequently measure swing mass of their tennis rackets to ensure the racquet fits the players' personal preference. Proper swinging mass proportions is essential to successful tennis play. Additionally, many tennis players own multiple racquets and need to ensure that all their rackets have identical (or nearly identical) swinging mass proportions.

If the multiple racquets each had a different swing mass or proportions of mass, a player will experience degradation in his or her tennis play when switching between unmatched racquets. The majority of conventional swing mass measurements are performed by costly computer-based equipment; the cost of such equipment makes it impossible for amateur players to own and verify the swing mass of his or her racquets. Other means of swing mass measurements can be performed; however, these other swing mass measurements require complicated pendulum resonance tests that are prohibitively difficult for a player to set up. Furthermore, this complicated test has low reliability and reproducibility, and additionally requires the player to mathematically calculate the swing mass number.

In addition, tennis players like to determine the center mass or balance, of their rackets via a conventional balance board, which are used by laying a racket on a small rod mounted on one side of a board; the racquet balance is found by adjusting the racquet into a perfectly horizontal, and floating position, centered over the small rod. Players determine that the racquet is laying horizontally by just their visual estimate. Players must read the center mass measurement from a small scale located at one end of the floating racquet. This measurement has low readability due to the racquet placement and movement. The low readability, in turn, yields low reliability and repeatability of results, so players currently tend to be using less than exact measurement data.

Therefore, systems and methods are needed for players to easily and accurately determine characteristics of their tennis equipment.

SUMMARY

According to some implementations of the present disclosure, an apparatus for measuring a swing mass moment of an implement includes a base, an arm, and an elastic element. The arm includes a grip and a beam. The grip is configured to receive a first portion of the implement. The beam is configured to couple the grip to the base. The beam is further configured to pivot according to a gravitational torque of the implement about the arm. The elastic element is coupled to the arm and the base, wherein the elastic element is configured to be in a first configuration until the grip receives the first portion of the implement.

In some examples, the apparatus further includes a scale and a scale indicator. The scale includes a plurality of readings. The scale indicator is coupled to the arm and is configured to identify a particular reading in the plurality of readings based on movement of the arm. In some examples, the scale is located on the base.

In some examples, the implement includes any of: a bat, a tennis racket, a golf club, a racquetball racket, and a squash racket. In some examples, the first portion of the implement includes a handle of the implement.

In some examples, the elastic element counters the gravitational torque of the implement about the arm when the grip receives the first portion of the implement. In some examples, the elastic element is a calibrated counter force member.

In some examples, the scale indicator identifies the particular reading according to a gravitational torque of the implement about the arm.

According to some implementations of the present disclosure, an apparatus for measuring a center of mass of an implement includes a base, a rotatable rod, a first arm, and a second arm. The rotatable rod is located at a first end of the base and is configured to pivot about its axis. The first arm is configured to guide a first portion of the implement and is configured to restrict movement of the implement over the base. The second arm includes a touch stylus and a pointer element. The touch stylus is configured to abut an end portion of the first portion of the implement when the implement is intersected by the second arm's radial movement. The pointer element is located on an end portion of the second arm.

In some examples, the apparatus further includes a scale. The scale includes a plurality of readings and is located on the base. The scale is positioned to correspond to a range of movement of the pointer element. The pointer element is configured to identify a particular reading in the plurality of readings when the touch stylus abuts the end portion of the first portion of the implement.

In some examples, the rotatable rod further includes an adjustment knob. Rotation of the rotatable rod is controlled by the adjustment knob.

In some examples, the first portion of the implement includes a handle of the implement. In some examples, the implement includes any of: a bat, a tennis racket, a golf club, a racquetball racket, and a squash racket.

According to some implementations of the present disclosure, an apparatus for measuring characteristics of an implement includes a base, a first arm, an elastic element, a rotatable rod, a second arm, and a third arm. The first arm includes a grip and a beam. The grip is configured to receive a first portion of the implement, and the beam is configured to couple the grip to the base. The beam is further configured to pivot according to a gravitational torque of the implement about the first arm. The elastic element is coupled to the first arm and the base. The elastic element is configured to be in a first configuration until the grip receives the first portion of the implement. The rotatable rod is located at a first end of the base and is configured to pivot about its axis. The second arm is configured to guide a first portion of the implement and is configured to restrict movement of the implement over the base. The third arm includes a touch stylus and a pointer element. The touch stylus is configured to abut an end portion of the first portion of the implement when the implement is intersected by the radial movement of third arm. The pointer element is located at an end portion of the third arm.

In some examples, the apparatus further includes a scale comprising a plurality of readings. In some examples, the apparatus further includes a scale indicator. The scale indicator is coupled to the first arm and is further configured to identify a particular reading in the plurality of readings based on movement of the first arm.

In some examples, the pointer element is configured to identify a particular reading in the plurality of readings when the touch stylus abuts the end portion of the first portion of the implement In some examples, the rotatable rod further includes an adjustment knob. Rotation of the rotatable rod is controlled by the adjustment knob.

In some examples, the first portion of the implement includes a handle of the implement. In some examples, the implement includes any of: a bat, a tennis racket, a golf club, a racquetball racket, and a squash racket.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1A:
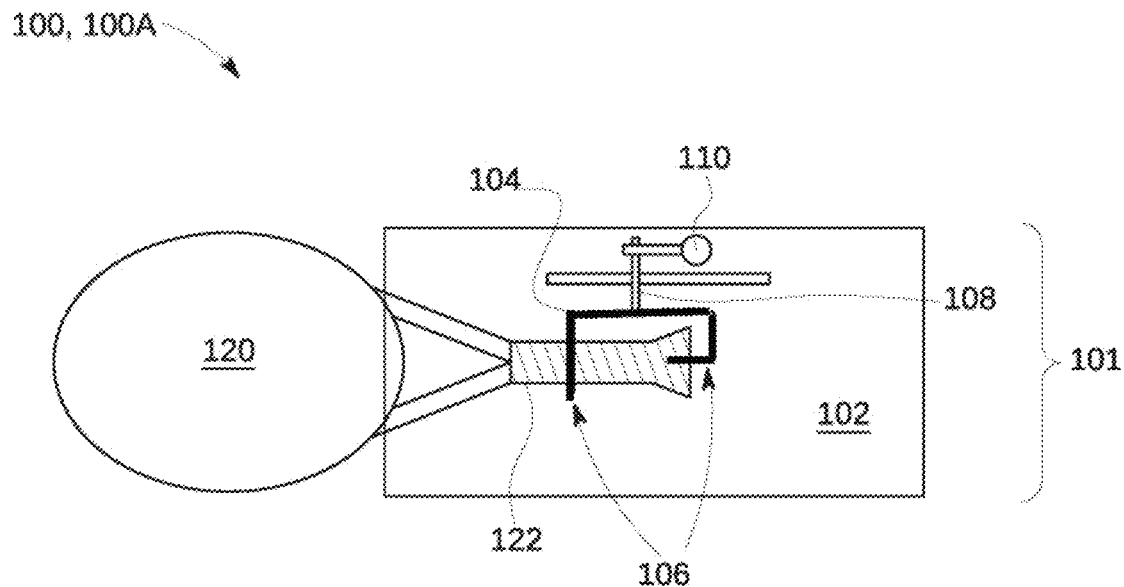
FIG. 1A shows a top view of an exemplary apparatus for measuring a swing mass moment of an implement, according to an embodiment of the present disclosure.

The present invention is described with reference to the attached figures, where like reference numerals are used throughout the figures to designate similar or equivalent elements. The figures are not drawn to scale, and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present disclosure provides systems and apparatuses configured to measure characteristics of sports implements. An exemplary apparatus is configured to measure both a swing mass moment and a center of mass point of an implement. The exemplary apparatus includes a base, a first arm, an elastic element, a rotatable rod, a second arm, and a third arm. The first arm includes a grip and a beam. The grip is configured to receive a first portion of the implement, and the beam is configured to couple the grip to the base. The beam is further configured to pivot according to a gravitational torque of the implement about the first arm. The elastic element is coupled to the first arm and the base. The elastic element is configured to be in a first configuration until the grip receives the first portion of the implement. The rotatable rod is located at a first end of the base and is configured to pivot about its axis. The second arm is configured to guide a first portion of the implement and is configured to restrict movement of the implement above the base. The third arm includes a touch stylus and a pointer element. The touch stylus is configured to abut an end portion of the first portion of the implement when the implement is intersected by the radial movement of third arm. The pointer element is located at an end portion of the third arm.

Therefore, the present disclosure provides a simplified, accurate, non-computerized, and mechanical apparatus which does not require the expensive equipment of conventional measurement systems. As discussed further herein, the disclosed apparatus further provides accurate and easily attainable measurements for both a center of mass point and a swing mass moment of an implement. Additionally, although much of the present disclosure is discussed with respect to a tennis racquet, any sports implement can be tested in the disclosed apparatuses, as would be readily understood by one skilled in the art. In some examples, the disclosed apparatuses measure characteristics of a golf club, a bat, a racquetball racquet, a squash racquet, a table tennis racquet, or any other sports implement where balance or swing mass is important to success in the sport.

Figure 1B:
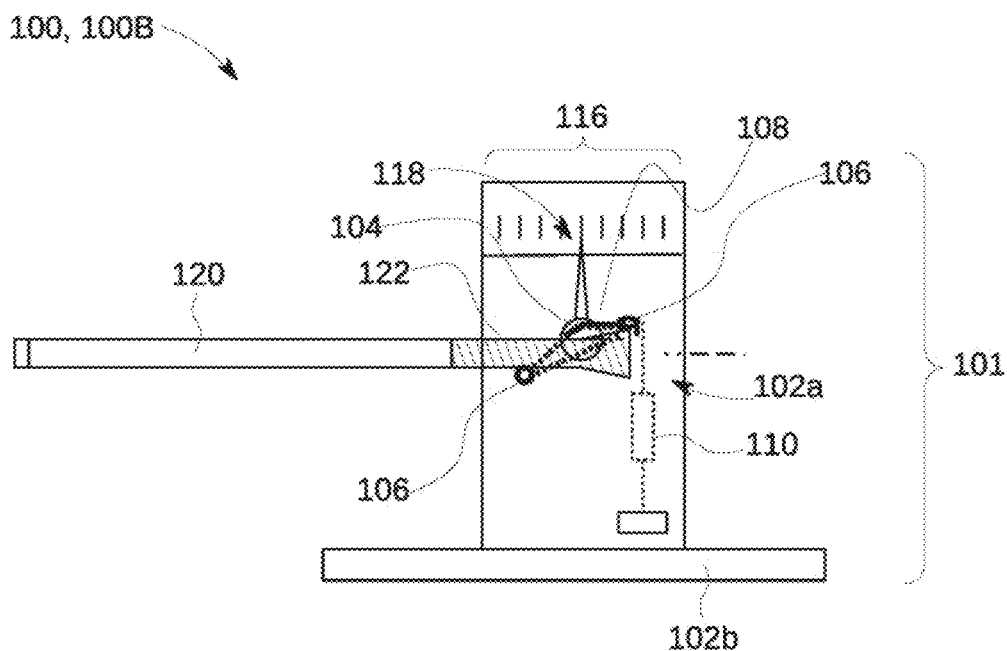
FIG. 1B shows a front view of the disclosed apparatus of FIG. 1A, according to an embodiment of the present disclosure.
Figure 1C:
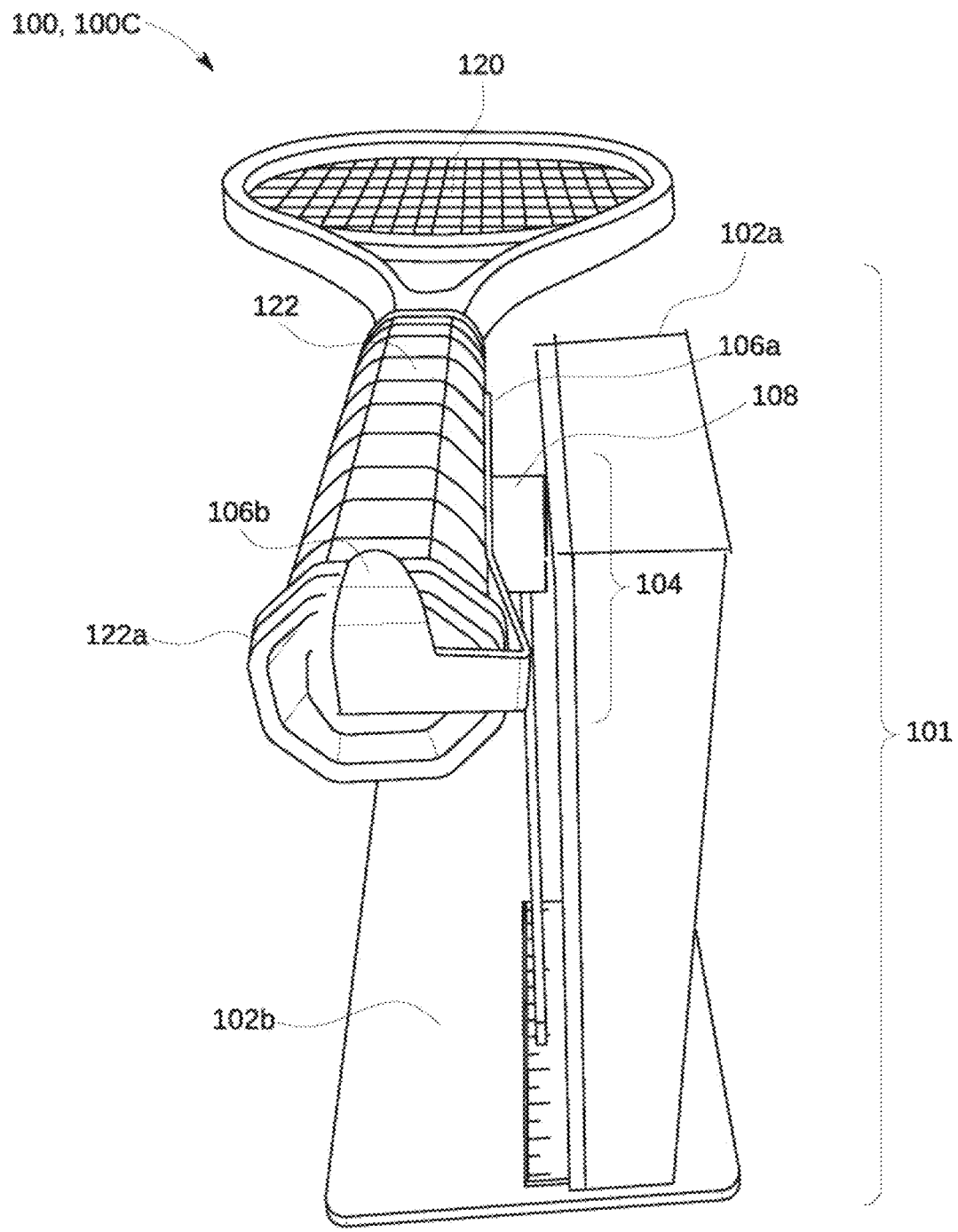
FIG. 1C shows a side view of the disclosed apparatus of FIGS. 1A and 1B, according to an embodiment of the present disclosure.

FIGS. 1A-1C show various views of a system 100 including the disclosed apparatus, shown as apparatus 101. For example, FIG. 1A shows a top view 100A, FIG. 1B shows a front view 100B, and FIG. 1C shows a side view 100C. System 100 includes an apparatus 101, a base 102, an arm 104, a grip 106, a beam 108, a counter force element 110, scale 116, scale indicator 118, implement 120, handle 122, and any combination thereof. For the purposes of the present disclosure, FIGS. 1A-1C will be discussed together to highlight various characteristics of apparatus 100.

System 100 includes an apparatus 101 and an implement 120. In some examples, implement 120 is a tennis racquet. Implement 120 includes a handle 122. Apparatus 101 receives implement 120 with an arm 104, which couples to the handle 122. Arm 104 includes a grip 106 and a beam 108. In some examples, the grip 106 is a c-shaped structure, a resting plate, or any other structure sufficient to hold and stabilize the implement 120. For example, as shown in FIG. 1C, the arm 104 extends along a length of the handle 122. The grip 106 includes a first portion 106a, which supports the underside of the handle 122, and a second portion 106b, which supports an upper side of the handle 122. The second portion 106b of the grip 106 is also configured to abut an end portion 122a of the handle 122, at a distal end of the arm 104. The beam 108 connects the arm 104 and the grip 106 to a base 102 of the apparatus 101.

As shown in FIGS. 1B and 1C, in some examples, the base 102 is a T-shaped or L-shaped structure with a vertical portion 102a and a horizontal portion 102b. The horizontal portion 102b serves to stabilize the entire apparatus 101; in some examples, the horizontal portion 102b is weighted to withstand torque imposed on the apparatus 101 by the implement 120. The vertical portion 102a serves to keep the implement 120 secured above the horizontal portion 102b of the base 102 so that the implement 120 can pivot via the beam 108.

The beam 108 is pivotably coupled to the vertical portion 102a. For example, the beam 108 is coupled via a ball and socket joint, or any other pivoting mechanism, as known in the art.

As shown in FIG. 1B, the arm 104 e.g., as attached to the beam 108) couples to a counter force elastic element 110. The counter force elastic element 110 serves to resist the gravitational torque exerted on the arm 104 when the arm 104 receives the implement 120. The counter force element 110 is in a first configuration (e.g., an unloaded configuration) before the grip 106 of the arm 104 receives the implement 120 (e.g., before the implement is loaded for measurement). The counter force elastic element 110 is in a second configuration (e.g., a calibrated counter force loaded configuration) after the grip 106 of the arm 104 receives the implement 120 (e.g., after the implement is loaded for measurement). In some examples, the counter force elastic element 110 is a massive counter weight, an elastic element, a spring, a magnetic force, or any other counter force element as readily contemplated by one skilled in the art.

In some examples as shown in FIG. 1B, the counter force element 110 is coupled to the base 102.

In some examples, the counter force of elastic element 110 is a calibrated force, which is opposed to the arm 104. This calibrated force element opposes pivotal torque of the arm 104 (when the arm 104 has received the implement 120) until the arm 104 reaches equalized forces between (1) a torque exerted by gravitational mass of the implement 120 and (2) the calibrated counter force of the elastic element 110. This equalized force results in an altered position of the arm 104; an angularity of the arm 104 (as moved from a first position of the arm 104 when the arm 104 has not received an implement 120) is thus indicative of the swing mass magnitude of the implement 120. This altered position of the arm 104 is therefore different for various swing weight implements tested, and will accurately measure them based on the angle of the arm 104 being at a particular altered angular position.

Apparatus 101 further includes a scale 116 and a scale indicator 118. The scale includes a plurality of readings and, in some examples, is located on the vertical portion 102a of the base 102. The scale indicator 118 is coupled to the arm 104 and configured to indicate one of the readings on the scale 116 according to movement of the arm 104 (e.g., when the arm 104 is in the altered position). For example, if the torque exerted by the racquet 120 is higher, the scale indicator 118 is configured to indicate a higher reading on the scale 116.

Movement of the scale indicator 118 is calibrated according to the force of the elastic element 110, according to any calibration means as known in the art. For example, the scale indicator 118 shows a specific reading on the scale 116 based on an angle of the arm 104 when the arm 104 has received the implement 120. In some examples of the present disclosure, the scale indicator 118 is coupled to the arm 104 so as to automatically point to a specific reading on the scale 116. Although scale 116 is shown to be above the implement 120, the present disclosure contemplates that the scale 116 and the scale indicator 118 can be anywhere on the vertical portion 102a of the base 102.

In some examples, the scale indicator 118 therefore identifies a swing mass of the implement 120 based on angular movement of the arm 104. For example, the scale indicator 118 can be configured to identify a particular reading on the scale 116 based on a difference in the angular position of (1) a resting position of the arm 104 (when the arm 104 has not received implement 120) and (2) an altered position of the arm 104 (when the arm 104 has received implement 120 and arrived at a position of equilibrium of forces, between gravitational torque of the implement 120 and the counter force elastic element 110). For example, the resting position of the arm 104 can have an angular position of reference zero degrees. The altered position of the arm 104 can have an angular position corresponding to a swing mass reading of the implement 120, when in opposition to the counter force elastic element 110.

In some examples, the scale 116 and the scale indicator 118 are digital devices configured to measure movement of the arm 104 and provide a swing mass reading accordingly.

Therefore, when apparatus 101 receives implement 120, implement 120 exerts gravitational torque about the arm 104. This torque causes the arm 104 to pivot until the arm 104 with the implement 120 reaches an equilibrium; the equilibrium is reached when a position of the implement 120 balances against the counter force exerted on the arm 104 by the counter force elastic element 110.

Therefore, FIGS. 1A-1C show how the disclosed apparatus converts pivotal torque created by an implement, when the implement is mounted on a pivot-able arm, and is opposed by a calibrated counter force element. This calibrated force element opposes the arms pivotal torque until the two opposing forces are equal, and a measurable angle of the pivot-able arm is reached. Additional examples of system 100 are discussed further below with regards to FIG. 5.

Figure 2A:
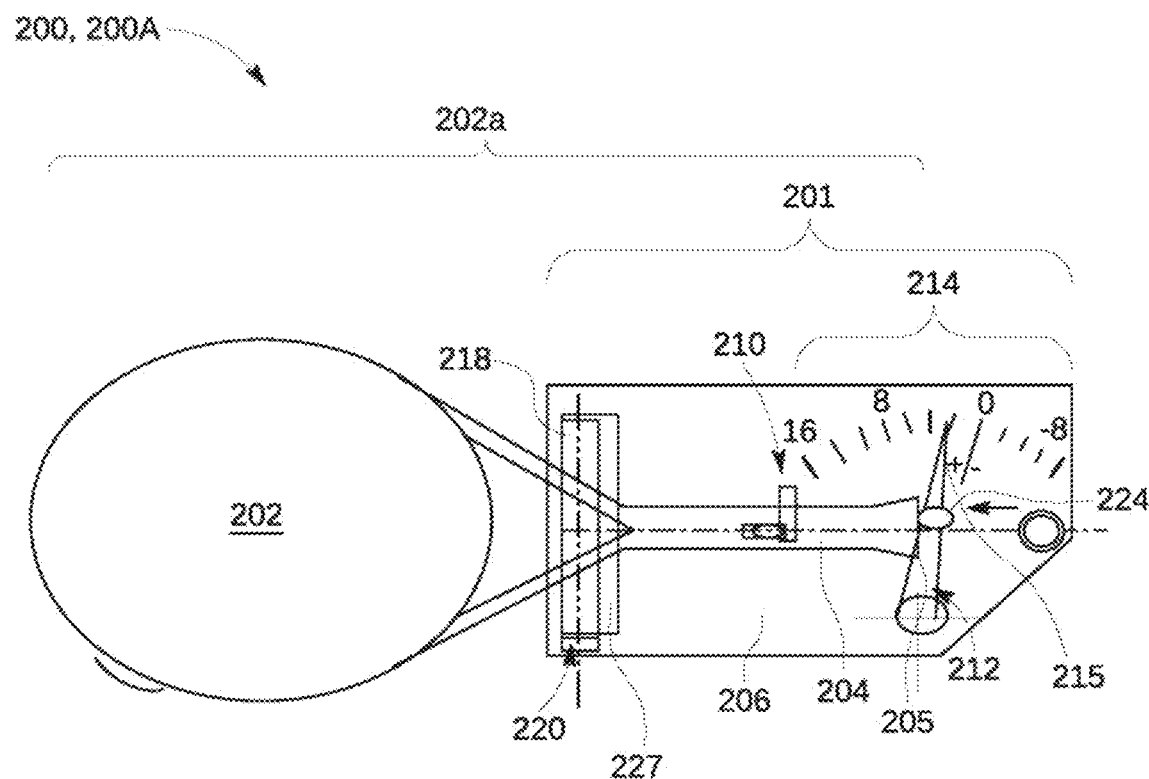
FIG. 2A shows a top view of an exemplary apparatus for measuring a center of mass point of an implement, according to an embodiment of the present disclosure.
Figure 2B:
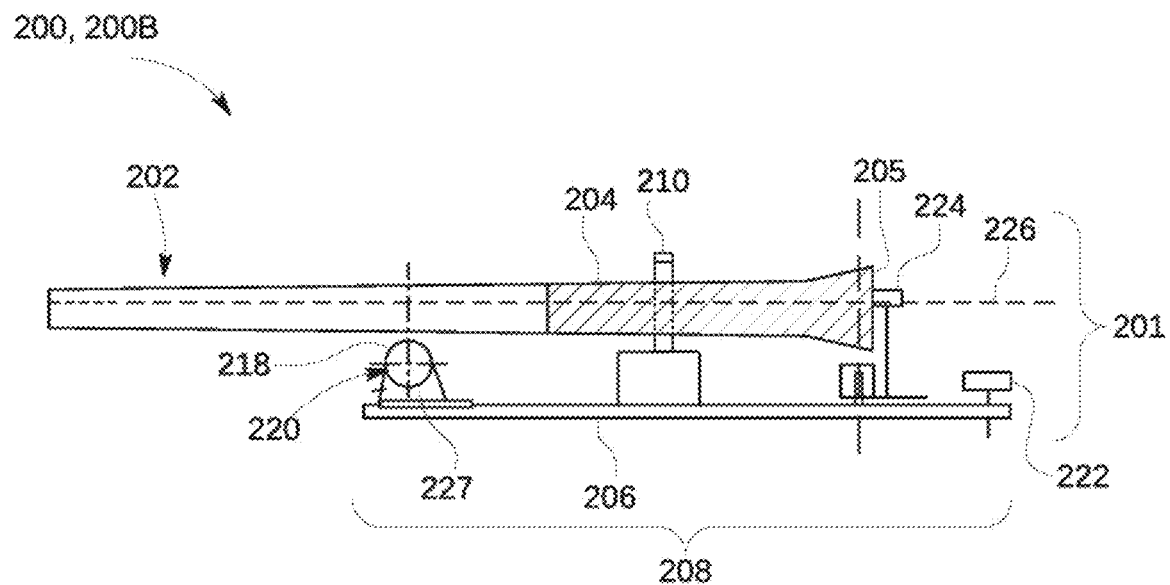
FIG. 2B shows a side view of the disclosed apparatus of FIG. 2A, according to an embodiment of the present disclosure.

FIGS. 2A-2B show various views of a disclosed apparatus configured to measure a center of mass point of an implement, shown as apparatus 200. For example, FIG. 2A shows a top view 200A, and FIG. 2B shows a side view 200B. Apparatus 200 includes an apparatus 201, implement 202, a handle 204, an end portion of the handle 205, a base 206, a base length 208, an arm 210, an arm 212, a mechanical scale 214, a rotatable rod 218, a rotatable rod support 227, an adjustment knob 220, a base adjuster 222. For the purposes of the present disclosure, FIGS. 2A and 2B will be discussed congruently to highlight various characteristics of apparatus 200.

System 200 includes an apparatus 201 and an implement 202. In some examples, implement 202 is a tennis racquet. Implement 202 includes a handle 204. Implement 202 can be received by apparatus 201 by laying a middle section of the implement 202 on top of the rotatable rod 218. The adjustment knob 220 is configured to rotate axle of the rotatable rod 218 causing the implement 202 to move toward either side of the rod 218 axial center until balanced horizontally with respect to gravity, yielding a balanced center mass position.

Figure 3:
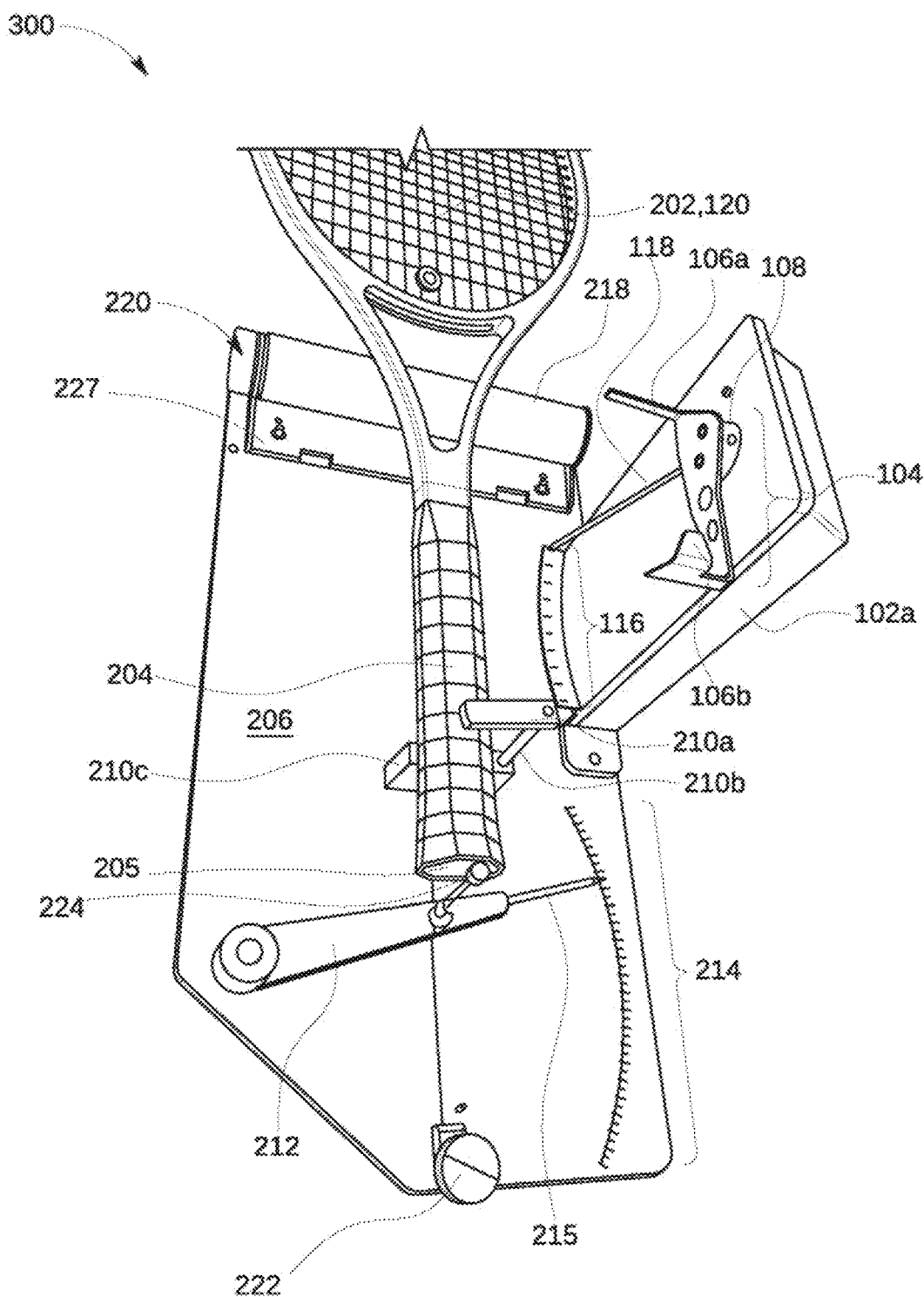
FIG. 3 shows an exemplary apparatus configured to measure a swing mass moment and a center of mass point of an implement, according to an embodiment of the present disclosure.

In some examples, shown in FIG. 2A, apparatus 201 further receives implement 202 with an arm 210, which guides and restricts the handle 204. Referring briefly to FIG. 3, in some examples, arm 210 is an L-shaped arm which attaches to the base 206. Arm 210 includes a horizontal portion 210a, a vertical portion 210b, and a base portion 210c. The implement 202 is raised above the base 206 by the rotatable rod 218, as discussed further below. For example, arm 210 is an alignment retention arm or said restriction arm.

In other examples, shown in FIG. 2B, apparatus 201 further receives implement 202 with an arm 212. The arm 212 includes a touch stylus 224 and a pointer element 215. The touch stylus 224 of the arm 212 is located on the base 206 at a location adjacent to an end portion 205 of the handle 204. In some examples, a position of the touch stylus 224 is adjusted according to the position of the implement 202 within a length 202a. The shape of the touch stylus 224 can be a round rod configured to align with the end portion of first portion of implement 202 on the apparatus 201 while exerting a minimum amount of pressure against the implement 202. The arm 210 further prevents the implement 202 from moving off the rotatable rod 218 while the rotatable rod 218 is being moved by the adjustment knob 220. In some examples, the arm 210 guides the implement 202 until the implement 202 is perpendicularly centered on the rotatable rod 218.

The implement 202 aligns perpendicularly to an axis of the rotatable rod 218. Additionally, or alternatively, the implement 202 is centered over the rotatable rod 218. In some instances, the rotatable rod 218 includes a support mounting 227 that is attached to base 206, allowing the rotatable rod 218 to turn freely. For example, the implement 202 will load atop rod 218, by a user. In some such instances, the rotatable rod 218 is configured as a circumferentially-rolling moving surface, allowing movement of the loaded implement 202 toward a balanced position. The rod 218 support mounting 227 is configured to move in increments on the base 206, such that the apparatus 201 can fit a plurality of implement lengths, while remaining calibrated.

Apparatus 201 further includes a rotatable rod 218 on the base 206. The rotatable rod includes an adjustment knob 220. The adjustment knob 220 is configured to move the rotatable rod 218 axially, causing circumferential movement. For example, the adjustment knob 220 rotates clockwise to move the rotatable rod 218 clockwise and rotates counter-clockwise to move the rotatable rod 218 counter-clockwise.

In some examples, the rotatable rod 218 further includes a rotatable rod support mounting 227 attached to the base 206. The support mounting allows the rotatable rod 218 to rotate freely when the implement 202 is received on top of the rotatable rod 218. In some examples, the support mounting 227 position can be adjusted relative to its initial location on the base 206 and move horizontally along a width 201 of the base 206. Therefore, system 200 can provide for receiving implements 202 of different lengths.

Therefore, when apparatus 201 has received implement 202, movement of the rotatable rod 218 adjusts whether implement 202 is balanced along a horizontal axis 226 (shown in FIG. 2B). When the implement 202 is in a balanced position, the touch stylus 224 can be moved to abut an end portion 205 (for example, a distal end) of the handle 204. The pointer element 215 of the arm 212 thus points to the scale 214, which includes a plurality of readings. The pointer element 215 identifies a particular reading in the scale 214, the particular reading corresponding to a center of mass point of the implement 202. For example, the arm 212 is configured to pivot radially i.e., so that an end portion (e.g., pointer element 215) of the arm 212 moves in a radial motion with pointer element 215 intersecting readings scale 214. In some examples, the scale 214 includes a plurality of readings which correspond to industry standard calibrations of center of mass points measured from the implement 202. For example, an apparatus 200 that is configured to measure a tennis racket includes a scale 214 with industry standard center of mass points.

Therefore, system 200 provides measurements with higher accuracy and reproducibility than conventional systems. For example, the adjustment knob 220 provides incremental shifting motion of the implement 202 laying on top of rotatable rod 218; this incremental shifting motion allows a user to easily achieve a balanced position of the implement 202. Lastly, the arm 212 is lengthy, allowing for the readings in the scale 214 to be expanded for ease of readability by the user.

FIG. 3 shows another embodiment of the present disclosure where the apparatus of FIGS. 1A-1C is combined with the apparatus of FIGS. 2A-2B to yield system 300. System 300 includes similar components and identical labels to systems 100 and 200 of FIGS. 1A-1C and FIGS. 2A-2B, respectively. Therefore, FIG. 3 demonstrates how an exemplary apparatus, according to an embodiment of the present disclosure, is configured to measure both a swing mass moment and a center of mass point of an implement. Additionally, although a tennis racket is shown as the implement 120 and 202 of FIGS. 1A-3, the present disclosure contemplates that any implement can be tested, as would be readily contemplated by one skilled in the art. Exemplary implements include baseball bats, softball bats, table tennis racquets, racquetball racquets, squash racquets, golf clubs, tennis racquets, and any other elongated sports implement, as known in the art.

Figure 4:
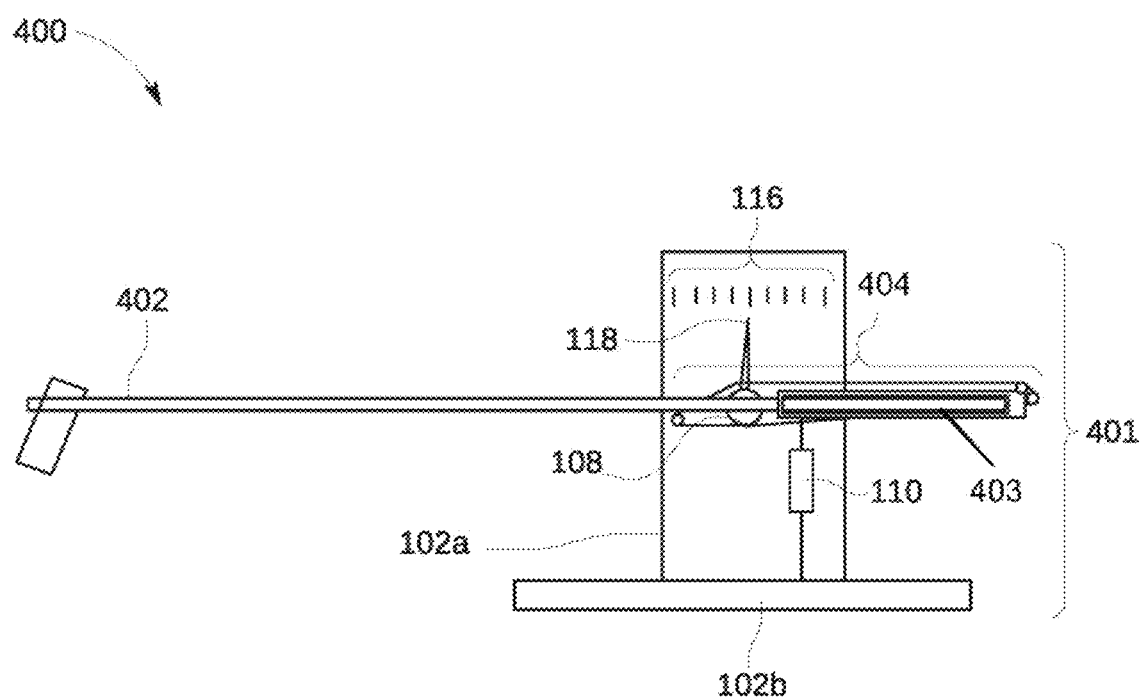
FIG. 4 shows an exemplary apparatus configured to measure a swing mass moment of a golf club, according to an embodiment of the present disclosure.

FIG. 4 shows an exemplary system 400 which includes an apparatus 401 and a golf club 402. Apparatus 401 contains similar elements to apparatus 101 of FIGS. 1A-1C. An arm portion 404 further receives the golf club 402. Arm portion 404 is modified as compared to arm 104 of FIGS. 1A-1C because a handle 403 of the golf club 402 is longer than a handle portion of a tennis racquet. Therefore, FIG. 4 demonstrates how the disclosed apparatus can be modified to accommodate dimensions of different implements. As readily contemplated by a person skilled in the art, arm portion 404 can be further modified to receive another sports implement, including, for example, baseball bats, softball bats, table tennis racquets, racquetball racquets, squash racquets, and any other elongated sports implement, as known in the art.

Figure 6A:
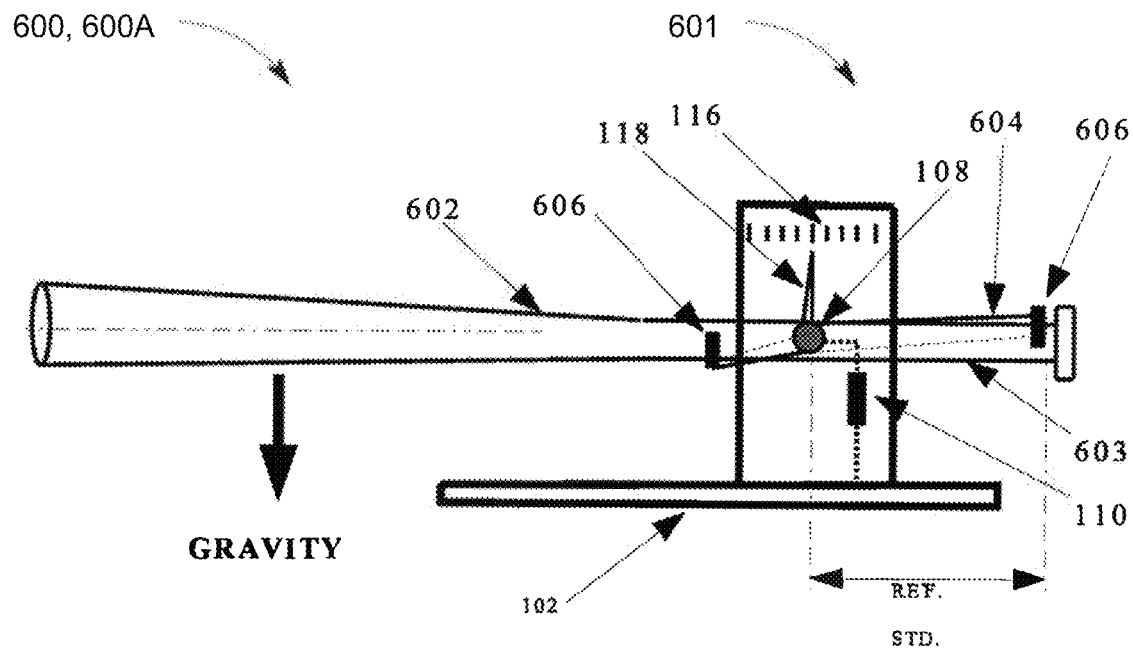
FIGS. 6A-6B show an exemplary apparatus configured to measure a swing mass moment of a ball bat, according to an embodiment of the present disclosure.
Figure 6B:
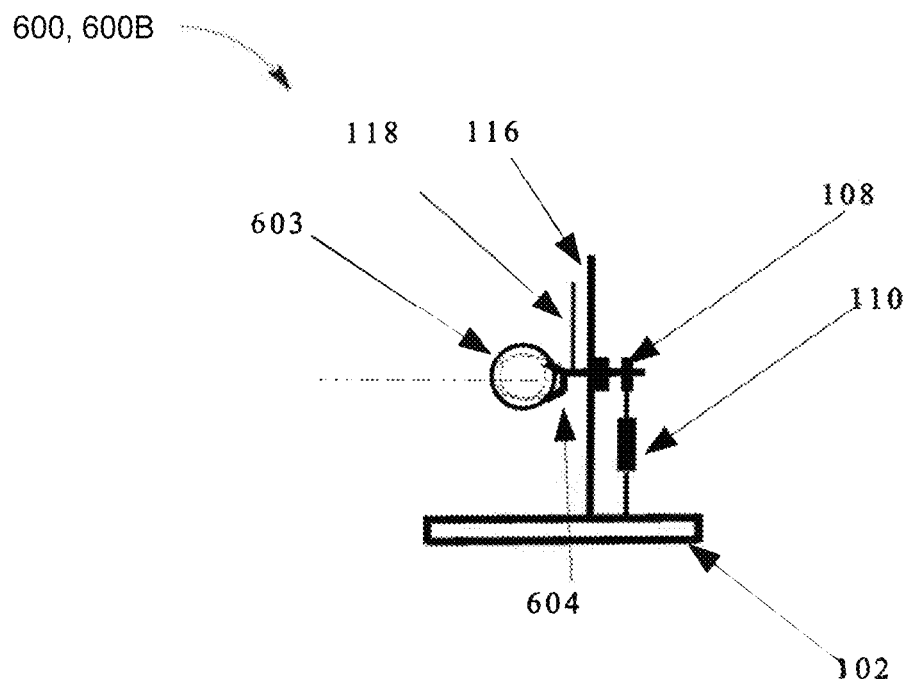

FIGS. 6A-6B show various views of an exemplary system 600. For example, FIG. 6A shows a front view of the system 600A, and FIG. 6B shows a side view of the system 600B. System 600 includes an apparatus 601 and a ball bat 602. Apparatus 601 contains similar elements to apparatus 101 of FIG. 1A. A pivotable arm portion 604 configured with grips 606 further receives the ball bat 602. Arm portion 604 is modified as compared to arm 104 of FIG. 1A because a handle 603 of the ball bat 602 is longer than a handle portion of a tennis racquet. Therefore, FIG. 6 demonstrates how the disclosed apparatus can be modified to accommodate dimensions of different implements. As readily contemplated by a person skilled in the art, arm portion 604 can be further modified to receive another sports implement, including, for example, table tennis racquets, racquetball racquets, squash racquets, and any other elongated sports implement, as known in the art.

Additional Embodiments

Figure 5:
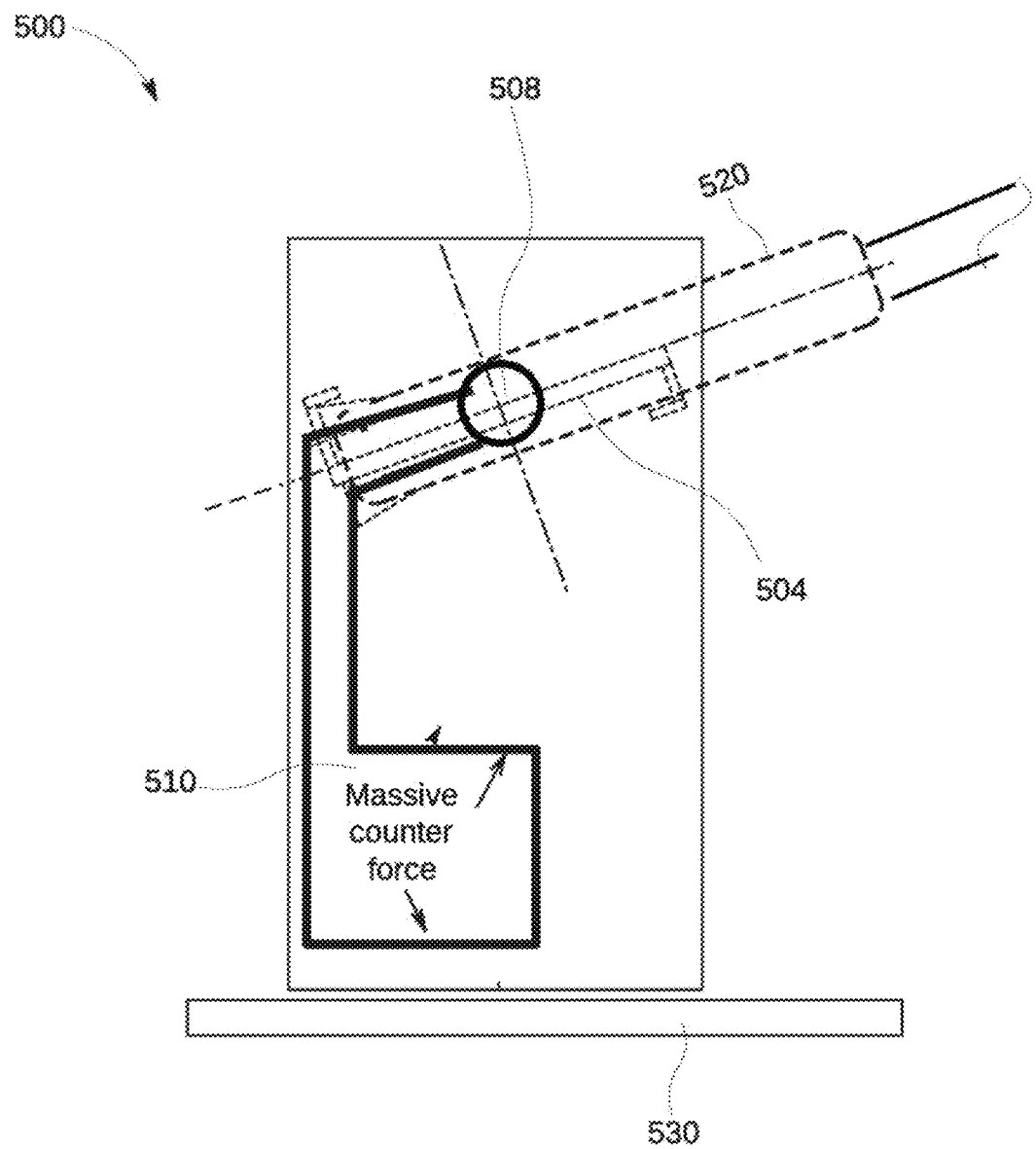
FIG. 5 illustrates an alternative embodiment of the disclosed apparatus of FIG. 1B, according to an embodiment of the present disclosure.

In some embodiments of the present disclosure, other mechanical mechanisms can be used to provide counter force against the gravitational torque of the arm 104 (as shown in FIGS. 1A-1C). For example, in one exemplary embodiment of the present disclosure as shown in FIG. 5, a massive counterweight element can be used. FIG. 5 shows an apparatus 500 which includes the elements that are the same as, or similar to, FIGS. 1A-1C, except that in FIG. 5, the massive counterweight element 510 is used in place of elastic element 110. In FIG. 5, like reference numerals are used to designate similar or equivalent elements of FIGS. 1A-1C. Therefore, FIG. 5 shows how the massive counterweight element 510 can be coupled to the pivoting joint of the arm 504 to oppose gravitational torque exerted on the arm 504 by an implement 520. The massive counterweight element 510 can be attached to the pivot beam 508, coupled to pivotable arm 504, supported by base 530.

While various examples of the present invention have been described above, it should be understood that they have been presented by way of example only, and not limitation. Numerous changes to the disclosed examples can be made in accordance with the disclosure herein without departing from the spirit or scope of the invention. Thus, the breadth and scope of the present invention should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. An apparatus for measuring a center of mass of an implement, comprising:
   a base;
   a rotatable rod located at a first end of the base and configured to pivot about its axis;
   a first arm configured to guide a first portion of the implement and configured to restrict movement of the implement above the base; and
   a second arm comprising a pivotal touch stylus and a pointer element, wherein the touch stylus is configured to abut an end portion of the first portion of the implement when the implement position intersects with the radial movement of the second arm, and wherein the pointer element is located at an end portion of the second arm.

2. The apparatus of claim 1, further comprising:
   a scale comprising a plurality of readings, located on the base and corresponding to a range of radial movement of the pointer element, wherein the pointer element is configured to identify a particular reading in the plurality of readings when the touch stylus abuts the end portion of the first portion of the implement.

3. The apparatus of claim 1, wherein the rotatable rod further comprises an adjustment knob, wherein rotation of the rotatable rod is controlled by the adjustment knob.

4. The apparatus of claim 1, wherein the first portion of the implement comprises a handle of the implement.

5. The apparatus of claim 1, wherein the implement comprises any of: a bat, a tennis racket, a golf club, a racquetball racket, and a squash racket.

6. An apparatus for measuring characteristics of an implement, comprising:
   a base;
   a first arm comprising a grip and a beam, the grip configured to receive a first portion of the implement, and the beam configured to couple the grip to the base, wherein the beam is further configured to pivot according to a gravitational torque of the implement about the first arm;
   an elastic element coupled to the first arm and the base, wherein the elastic element is configured to be in a first configuration until the grip receives the first portion of the implement;
   a rotatable rod located at a first end of the base and configured to pivot about its axis;
   a second arm configured to guide a first portion of the implement and configured to restrict movement of the implement over the base; and
   a third arm comprising a touch stylus and a pointer element, wherein the touch stylus is configured to abut an end portion of the first portion of the implement when the implement is intersected by the radial movement of the third arm, and wherein the pointer element is located at an end portion of the third arm.

7. The apparatus of claim 6, wherein the apparatus further comprises a scale comprising a plurality of readings.

8. The apparatus of claim 7, wherein the pointer element is configured to identify a particular reading in the plurality of readings when the touch stylus abuts the end portion of the first portion of the implement.

9. The apparatus of claim 7, wherein the apparatus further comprises a scale indicator, wherein the scale indicator is coupled to the first arm and is further configured to identify a particular reading in the plurality of readings based on movement of the first arm.

10. The apparatus of claim 6, wherein the rotatable rod further comprises an adjustment knob, wherein rotation of the rotatable rod is controlled by the adjustment knob.

11. The apparatus of claim 6, wherein the first portion of the implement comprises a handle of the implement.

12. The apparatus of claim 6, wherein the implement comprises any of: a bat, a tennis racket, a golf club, a racquetball racket, and a squash racket.

\* \* \* \* \*